United States Patent [19]

Voss

[11] Patent Number: 4,461,737
[45] Date of Patent: Jul. 24, 1984

[54] METHOD AND APPARATUS FOR FORMING PELLETS

[75] Inventor: Raymond G. Voss, Bartlesville, Okla.

[73] Assignee: Phillips Petroleum Company, Bartlesville, Okla.

[21] Appl. No.: 465,218

[22] Filed: Feb. 9, 1983

[51] Int. Cl.³ .............................................. B29C 17/14
[52] U.S. Cl. ...................................... 264/142; 425/68; 425/313
[58] Field of Search ................ 264/167, 142; 425/311, 425/313, 68

[56] References Cited

U.S. PATENT DOCUMENTS

| | | | |
|---|---|---|---|
| 2,401,236 | 5/1946 | Fielitz | 425/313 |
| 3,196,487 | 7/1965 | Snelling | 18/12 |
| 3,206,529 | 9/1965 | Heijuis | 264/178 F |
| 3,230,582 | 1/1966 | Hoffman et al. | 18/12 |
| 3,266,090 | 8/1966 | Gosney | 18/12 |
| 3,341,892 | 9/1967 | Mayneu | 425/313 |
| 3,676,029 | 7/1972 | Hopkin | 425/67 |
| 3,792,950 | 2/1974 | Cuff | 425/313 |
| 3,846,529 | 11/1974 | Poteet | 264/142 |
| 4,011,170 | 3/1977 | Pickin et al. | 264/142 |
| 4,046,497 | 9/1977 | Newman | 425/313 |
| 4,071,307 | 1/1978 | Porro | 425/72 R |
| 4,120,625 | 10/1978 | Hackroth | 425/313 |
| 4,150,595 | 4/1979 | Loffler | 425/313 |
| 4,212,617 | 7/1980 | Bagdan et al. | 264/142 |
| 4,249,879 | 2/1981 | Anders et al. | 264/142 |
| 4,264,553 | 4/1981 | Loo | 264/142 |
| 4,300,877 | 11/1981 | Andersen | 425/67 |
| 4,385,016 | 5/1983 | Gwinn | 264/142 |

FOREIGN PATENT DOCUMENTS

| | | | |
|---|---|---|---|
| 55-90309 | 7/1980 | Japan | 264/142 |
| 56-4416 | 1/1981 | Japan | 264/142 |
| 7413483 | 3/1981 | Netherlands | . |

OTHER PUBLICATIONS

*Plastics World*, vol. 36, Jul. 1978, pp. 46 and 47.

Primary Examiner—Jay H. Woo

[57] ABSTRACT

Apparatus for forming pellets from extruded strands of thermoplastic material which includes a liquid-filled tank, an extrusion die face disposed beneath the liquid in the tank, at least one knife blade movable in a direction of movement over the die face to cut pellets from at least one strand of material extruded through an orifice communicating with the die face, a wing extending from the knife blade in a direction opposite the direction of movement of the knife blade and defining a space between the wing and the die face, and means for injecting a purge gas into the space to purge the liquid therefrom. Also disclosed is a method of forming pellets from a strand of thermoplastic material extruded below the surface of a quantity of liquid.

13 Claims, 3 Drawing Figures

METHOD AND APPARATUS FOR FORMING PELLETS

The invention relates generally to the manufacture of pellets of extrudable material. In a more specific aspect the invention relates to both method and apparatus for making pellets from thermoplastic materials.

It is known to extrude a molten mass of thermoplastic material into filaments or strands, to lead the filaments or strands through air or a liquid coolant for stiffening them, and to cut the stiffened filaments or strands into short cylindrical stumps, chips or pellets by means of suitable shearing apparatus. However, because of the softness of the warm extruded material, and due to nonuniformity of the sizes of the holes in the die and of the cooling rates of the several filaments or strands, differences in length often arise among the filaments. These differences are either absorbed in the cutting step, thus leading to nonuniformity in the size and shape of the chips and causing malfunctions of the chip or pellet-making machine, which malfunctions eventually have to be cured by stopping the machine to remove the thermoplastic material therefrom.

There have been attempts in the past to overcome the above inconveniences by avoiding the cooling step and cutting the filaments into chips or pellets directly at the exit from the die. These attempts, however, have only been successful with quickly stiffening materials such as polyvinyl chloride. With materials such as polyethylene and polypropylene, on the other hand, the chips or pellets, if cut directly at the exit of the die, are soft and tacky and tend to lump together and stick to the shearing blade and to the walls of the surrounding enclosure.

As disclosed in U.S. Pat. No. 4,300,877, issued to Anderson, it is known to use an underwater pelleting device comprising a die plate submerged in a body of water contained in a cavity. The die plate includes a plurality of extrusion orifices in communication with the cavity. A rotatable knife hub having a plurality of knives ssecured thereto is positioned for cutting thermoplastic material extruded from the orifices into pellets. The hot thermoplastic material is continuously extruded through the orifices of the die plate in the form of hot thermoplastic filaments, rods or strands into the water-filled cavity. As the strands are extruded, and while immersed in water, they are cut into short lengths or pellets by the rapidly revolving knives. The resulting pellets are quickly cooled by the water and carried from the cavity to a collection station. In order to maintain more constant and uniform contact between the water and face of the die intersecting the orifices, the Anderson patent discloses the use of a diverter plate carried by the hub parallel to and spaced a relatively short distance from the face of the die. Water is directed through the interior of the hub and out into the space between the diverter plate and the face of the die in order to reduce non-uniform cooling of the heated die face by reducing vortexing or cavitation produced by the rapidly revolving knives.

Existing underwater pelleting or pellet-cutting devices are still deficient in a number of areas. One problem encountered is evident during machine startup where water or other suitable liquid in the cooling chamber or cavity in contact with the die face causes excessive cooling of the die face and adversely affects the pellet cutting operation and the quality of the pellets produced. Existing pelleting devices still exhibit nonuniform cooling across the face of the die attributable to the generation of cavitation and vortices in the cooling water by the rapidly revolving knives. Another problem encountered in existing underwater pellet-cutting devices is that during the pelleting of high melt flow resins, excessive and/or nonuniform cooling of the die face by the cooling water often results in blocking or "freezing off" of one or more of the extrusion orifices resulting in reduced resin throughput, inconsistent pellet quality and machine shutdown in order to dismantle and clear the orifices of the die plate.

In accordance with one aspect of the invention, an improved method of forming thermoplastic pellets is provided. This method includes extruding at least one strand of heated thermoplastic material from the face of a die via an orifice therein beneath the surface of a quantity of liquid; cutting the strand at the face of the die with a knife moving along the face of the die to form a pellet; separating at least a portion of the face of the die from contact with the liquid by directing at least one stream of gas over the face of the die adjacent the knife; and cooling the thus formed pellet by contacting the pellet with the liquid.

In another aspect, the invention is directed to apparatus comprising tank means for holding a quantity of liquid therein up to a predetermined liquid level; die means having a die face positioned within the tank means below the liquid level and having at least one extrusion orifice means therein for passing extruded material therethrough into the tank; knife means adapted to move along the die face over the at least one extrusion orifice in a direction of movement for cutting extruded material passing from the at least one extrusion orifice means; wing means carried by and extending from said knife means in a direction generally opposite the direction of movement of the knife means and defining a space between the die face and the wing means for separating the die face from a quantity of liquid in the tank means; the gas purge means communicating with the space for introducing gas into the space and thereby purging liquid from the space and from contact with at least a portion of the die face.

It is an object of the invention to provide an improved method of producing extruded pellets.

Another object of the invention is to provide improved apparatus for producing extruded pellets.

Yet another object of the invention is to provide method and apparatus which improves the uniformity of cooling of extruded pellets.

Still another object of the invention is to provide method and apparatus which eliminate the occurrence of extrusion orifice "freeze off" in an underwater pelleting operation.

Another object of the invention is to provide method and apparatus which overcome the deficiencies of prior underwater pelleting devices.

Yet another object of the invention is to provide apparatus which produces improved extruded pellets, such as thermoplastic pellets.

Still another object of the invention is to provide simple, reliable, efficient and economical method and apparatus for producing extruded pellets, such as thermoplastic pellets.

Other aspects, objects and advantages of the invention will become apparent upon consideration of the instant specification, appended claims and accompanying drawings, in which:

Figure 1:
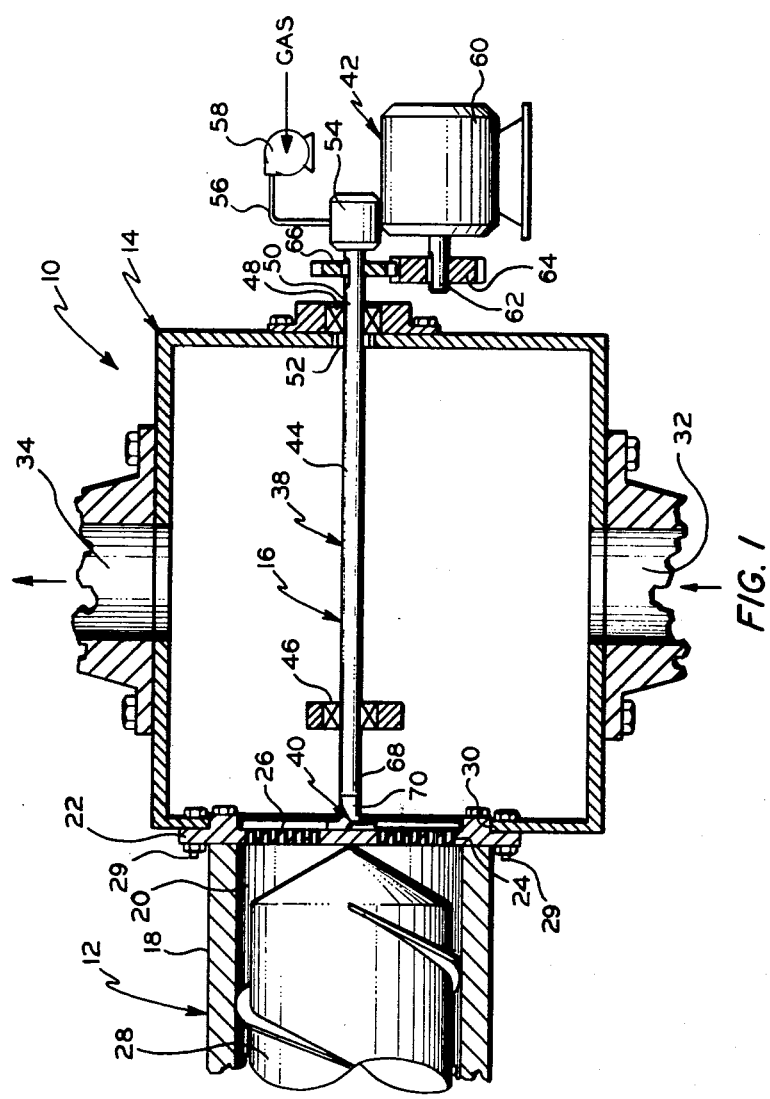
FIG. 1 is a side elevational view of one embodiment of an underwater pelleting device with portions thereof broken away along the longitudinal center line thereof to more clearly illustrate the construction thereof.

Referring now to the drawings, the reference character 10 generally designates apparatus constructed in accordance with the present invention. The apparatus 10 comprises an extruder 12, a hood or tank 14 and a pellet cutting assembly 16.

The extruder 12 comprises an extruder body 18 defining an extrusion cavity 20. The extrusion cavity 20 is closed at one end thereof by means of a die plate 22 which is provided with a plurality of extrusion orifices 24 communicating between the extrusion cavity 20 and the outer die surface or face 26. The extruder 12 is further provided with a suitable mandrel or auger 28 journaled within extrusion cavity 20 for extruding material such as thermoplastic material from the extrusion cavity 20 through the extrusion orifices 24.

The extruder 12 is fixedly mounted to one end of the hood 14 by suitable means such as threaded bolts 29. The die plate 22 communicates with the interior of the tank 14 via a suitable opening 30 in one end wall of the tank 14.

The hood 14 is provided with an inlet conduit 32 and an outlet conduit 34 through which a suitable cooling liquid, such as water, can be introduced into and removed from the hood 14. The conduits 32 and 34 provide means for circulating cooling liquid through the hood 14 to both fully submerge the outer die surface 26 of the die plate 22 below a predetermined liquid level and pick up and carry cooled pellets as a slurry out of the hood 14 via outlet conduit 34 to suitable means (not shown) for separating the pellets from the liquid. Typically cooling water is feed to the hood 14 at a rate of about 40 gallons per minute per 1000 pounds of pellets per hour. This feed rate generally ranges up to about 800 gallons per minute.

The pellet cutting assembly 16 comprises a drive shaft assembly 38 journaled within the tank 14, a knife assembly 40 drivingly secured to one end of the drive shaft assembly adjacent the outer die surface 26 of the die plate 22, and a drive motor assembly 42 drivingly secured to the opposite end of the drive shaft assembly 38.

The drive shaft assembly 38 includes a tubular drive shaft 44 journaled in a pair of bearings 46 and 48 carried by the tank 14. One end portion 50 of the shaft 44 extends through a wall of the tank 14 adjacent the bearing 48. A suitable seal 52 provides fluid tight sealing engagement between the wall of the tank 14 and the rotatable drive shaft 44. The longitudinal passage extending through the tubular shaft 44 communicates at the one end portion 50 thereof with a suitable rotating coupling 54, which coupling is connected via conduit 56 to a suitable source of air or other gas, such as a blower 58.

The drive motor assembly 42 includes a suitable drive motor 60 having a drive shaft 62 which is drivingly secured to the end portion 50 of the drive shaft 44 by suitable means such as a pair of meshed spur gears 64 and 66. It will be understood that the drive motor 60 can be any form of drive motor, such as a variable speed motor, having sufficient power to drive the pellet cutting assembly 16 under normal operating conditions. It will also be apparent that other means of driving engagement may be employed between the drive motor 60 and the drive shaft 44, e.g. direct drive, belt drive, variable speed drive, etc., as may be desired.

Figure 3:
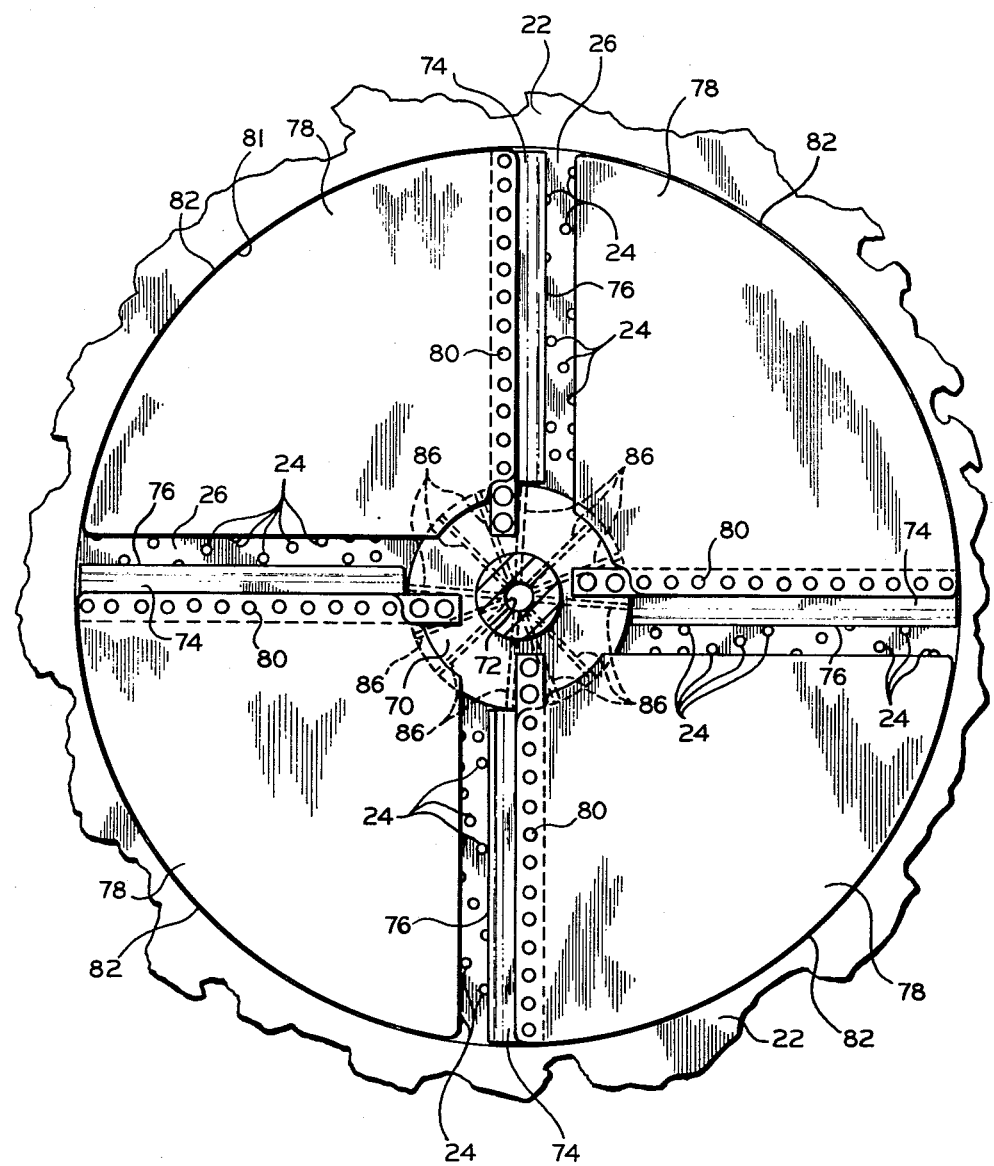
FIG. 3 is an enlarged fragmentary view taken along lines 3—3 of FIG. 2.

The knife assembly 40 is drivingly secured to the opposite end portion 68 of the drive shaft 44. The knife assembly 40 comprises a knife hub 70 having a cavity 72 therein. The hub 70 is drivingly secured by suitable means, such as threaded interconnection, with the end portion 68 of the drive shaft 44, with the cavity 72 in fluid flow communication with the longitudinal passage of the tubular drive shaft 44. Four knife blades 74 are circumferentially spaced around the knife hub 70, are fixedly secured thereto and extend radially outwardly therefrom. Each knife blade 74 is provided with a cutting edge 76 which engages the outer die surface or face 26. The cutting edges 76 of the knife balde 74 are adapted to be revolved about the rotational axis of the tubular drive shaft 44 in a clockwise direction as viewed in FIG. 3. It will be understood that any number of knife blades 74 can be employed in the knife assembly 40 which will achieve desired results in pellet cutting.

Figure 2:
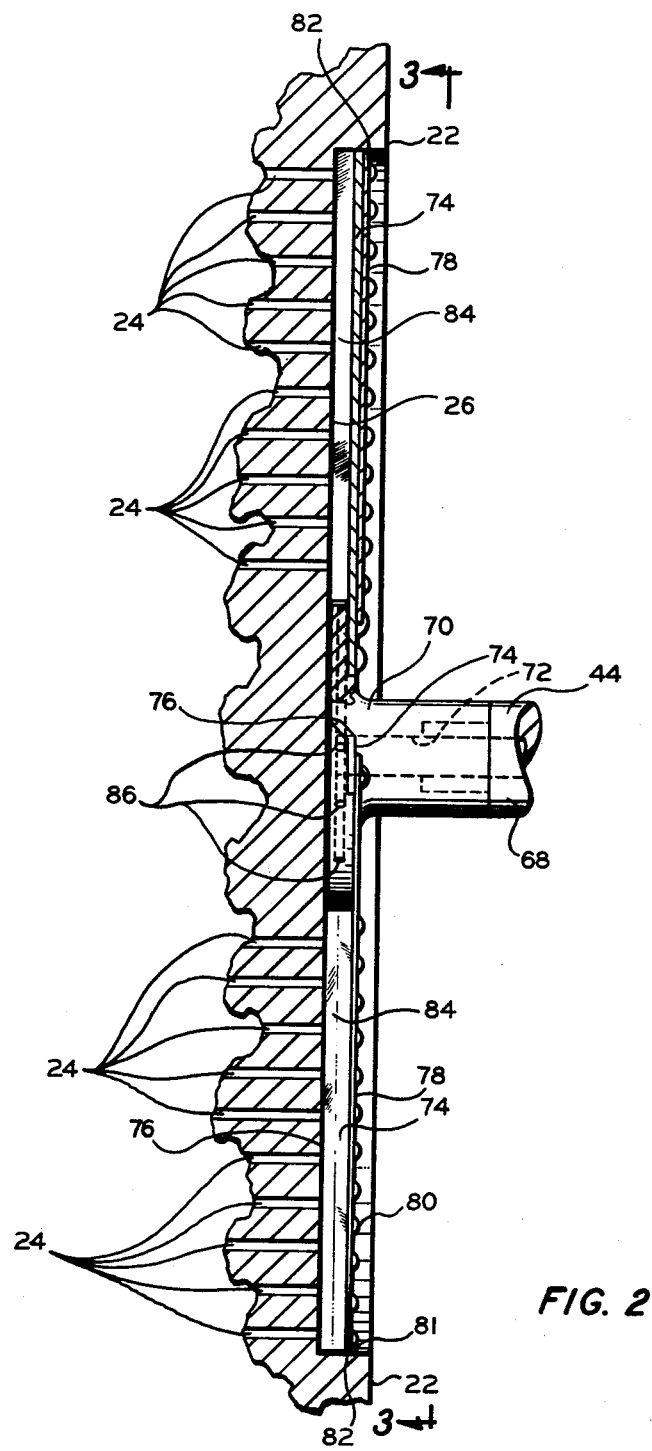
FIG. 2 is an enlarged fragmentary view of a portion of the apparatus of FIG. 1, with portions thereof broken away, more clearly illustrating the structure at the location of engagement between the die face and knife blades.

A cantilevered member in the form of a plate of wing 78 is secured to each knife blade 74 along substantially the full length of the respective knife blade by suitable mans such as solid rivets 80. The knife baldes 74 and the respective wings 78 are preferably encircled by a cylindrical surface 81 which is coaxially aligned with the axis of rotation of the drive shaft 44 and knife assembly 40 and extends a substantial distance to the right, as viewed in FIG. 2, from the outer die face or surface 26 of the die plate 22. Each wing 78 is provided with a curved radially outwardly facing surface 82 which conforms to the inner cylindrical surface 81 with a minimum radial clearance therebetween. As best shown in FIG. 2, each cantilevered plate or wing 78 is aligned generally parallel to the outer die surface 26 and is spaced a perpendicular distance from the outer die surface 26 thereby defining a space 84 between each plate or wing 78 and the outer die surface surface or face 26. The cutting edge 76 of each knife blade 74 is spaced along the circular direction of movement from the trailing edge of the wing 78 extending from the next adjacent knife balde 74.

The knife hub 70 is further provided with a plurality of radially extending passages 86 which provide fluid communication between the cavity 72 and each space 84 defined by a cantilevered plate or wing 78. The passages 86, the cavity 72, the interior of the tubular drive shaft 44, the coupling 54, the conduit 56, and the blower 58 provide means for injecting at least one stream of purge gas into each space 84 to purge liquid carried within the liquid tank or reservoir 14 from each space 84, and therefore away from the portion of the outer die surface 26 defining each space 84.

In operation, the apparatus 10 can be advantageously employed in the formation of pellets of extruded thermoplastic material. Among the thermoplastic materials which can be processed by the apparatus 10 are polyethylene and polypropylene. In order to extrude such thermoplastic materials through the orifices 24 of the apparatus 10, it is necessary to heat the die plate 22 to a predetermined operating temperature before the extruded material will meet desired specifications. Accordingly, a first step in the operation of the apparatus 10 calls for starting the blower 58 to begin injecting purge gas into the spaces 84 between the wings 78 and the outer die surface 26 while simultaneously activating the drive motor assembly 42 to revolve the knife blades 74 along the outer die surface 26. Thereafter, the die plate 22 is heated by suitable conventional means (not shown) until the desired operating temperature is reached. It will be seen that by revolving the knife blades 74 and the respective wings 78 while simultaneously injecting purge gas into the spaces 84, a minimum of contact between the liquid carried in the liquid tank 14 and the outer die surface 26 is achieved since only the narrow strip or space between the trailing edge of each wing and the cutting edge 76 of the next following knife blade 74 will admit liquid to the outer die surface 26. When the predetermined operating temperature of the die plate 22 is obtained, extrusion of thermoplastic filaments or strands through the extrusion orifices 24 can commence and the revolving knife blades 74 will continuously cut the continuous strands into the desired pellets which are briefly in contact with the liquid before being severed from their respective strands by the cutting edges 76 of the knife blades 74.

By minimizing the amount of time that each strand of extruded thermoplastic is permitted to contact the cooling liquid in the tank 14 prior to being severed by a knife blade 74, premature or excessive cooling of the extruded thermoplastic in the extrusion orifices 24 is eliminated thus preventing blocking or "freezing off" of the extrusion orifices by the cooled thermoplastic. Thus, it will be seen that the present invention clearly overcomes the disadvantages of the prior devices discussed above and readily meets all the objects previously recited for the invention.

Changes may be made in the combination and arrangement of parts or elements as heretofore set forth in the specification and shown in the drawing without departing from the spirit and scope of the invention as defined in the following claims.

I claim:

1. A method of forming thermoplastic pellets comprising:
   (a) extruding at least one strand of heated thermoplastic material from the face of a die via an extrusion orifice therein beneath the surface of a quantity of liquid;
   (b) cutting said strand at the face of said die with the cutting edge of a knife moving along the face of said die to form a pellet of said thermoplastic material;
   (c) separating at least a portion of the face of said die from contact with the liquid in which it is submerged by directing at least one stream of gas over the face of said die adjacent said knife; and
   (d) cooling said thus formed pellet by contacting said pellet with said liquid.

2. A method in accordance with claim 1 wherein said at least one strand of heated thermoplastic material is continuously extruded via said extrusion orifice and said strand is repeatedly cut by said knife to form a series of said pellets.

3. A method in accordance with claim 1 wherein a plurality of strands of heated thermoplastic material are continuously extruded via corresponding extrusion orifices from the face of said die.

4. A method in accordance with claim 3 wherein said plurality of strands are repeatedly cut by a plurality of said knives to form a series of said pellets.

5. A method in accordance with claim 1 wherein said separating step (c) is characterized further to include supporting a wing on said knife substantially parallel to the face of said die and spaced a perpendicular distance from the face of said die and injecting said stream of said gas into the space between the face of said die and said wing to purge liquid from said space.

6. A method of forming thermoplastic pellets comprising:
   (a) extruding at least one strand of heated thermoplastic material from the face of a die via an extrusion orifice therein beneath the surface of a quantity of liquid;
   (b) cutting said strand at the face of said die with the cutting edge of a knife moving along the face of said die to form a pellet of said thermoplastic material;
   (c) separating at least a portion of the face of said die from contact with the liquid in which it is submerged by directing at least one stream of gas over the face of said die adjacent said knife; and
   (d) cooling said thus formed pellet by contacting said pellet with said liquid; and
   wherein a plurality of strands of heated thermoplastic material are continuously extruded via corresponding extrusion orifices from the face of said die, wherein said plurality of strands are repeatedly cut by a plurality of said knives to form a series of said pellets, and wherein said separating step (c) is characterized further to include supporting a wing on each of said plurality of knives substantially parallel to the face of said die and spaced a perpendicular distance from the face of said die and injecting at least one stream of said gas into the space between the face of said die and each of said wings to purge liquid from each of said spaces.

7. Apparatus for forming pellets of extruded material, comprising:
   tank means for holding a quantity of liquid therein up to a predetermined liquid level;
   die means having a die face positioned within said tank means below the liquid level and having at least one extrusion orifice means therein for passing extruded material therethrough into said tank below the liquid level;
   knife means adapted to move along said die face over said at least one extrusion orifice means in a direction of movement for cutting extruded material passing from said at least one extrusion orifice means;
   wing means carried by said knife means and extending therefrom in a direction generally opposite the direction of movement of said knife means and being aligned substantially parallel to said die face and defining a space between said die face and said wing means for separating said die face from a quantity of liquid in said tank means; and
   gas purge means for introducing said gas into the space between said wing means and said die face to thereby purge liquid from the space and prevent liquid contact with at least a portion of said die face partially defining the space.

8. Apparatus in accordance with claim 7 wherein said knife means is characterized further to include at least one blade having a cutting edge adapted to move along the surface of said die face and across said extrusion orifice means in said direction of movement; and
   wherein said wing means is characterized further to include a member extending from each blade in a direction substantially opposite the direction of movement of the respective blade, each said member being aligned generally parallel to the surface of said die face and being spaced a distance from the surface of said die face.

9. Apparatus in accordance with claim 8 characterized further to include:
   drive means operatively connected to said at least one blade for moving said at least one blade along the surface of said die face and across said extrusion orifice means in said direction of movement.

10. Apparatus in accordance with claim 9 wherein said drive means is characterized further to include:
   a rotary drive shaft journaled adjacent said die means and drivingly secured to said at least one blade; and
   drive motor means drivingly secured to said shaft for rotating said shaft about its longitudinal axis and thereby revolving said at least one blade about said axis along the surface of said die face and across said extrusion orifice means in said direction of movement.

11. Apparatus in accordance with claim 10 wherein said gas purge means is characterized further to include:
   gas passage means carried by said rotary drive shaft and providing fluid flow communication between a source of gas and the space between each generally flat member and the surface of said die face.

12. Apparatus in accordance with claim 7 wherein said knife means is characterized furhter to include a plurality of blades each having a cutting edge adapted to move along the surface of said die face and across said extrusion orifices means in a circular direction of movement; and wherein said wing means is characterized further to include a generally flat member extending from each of said blades in a direction substantially opposite the direction of movement of the respective blade, each said generally flat member being aligned substantially parallel to the surface of said die face being spaced a distance from the surface of said die face.

13. Apparatus in accordance with claim 12 wherein the cutting edge of each blade is spaced a distance along said circular direction of movement from the generally flat member extending from the next adjacent blade.

* * * * *